United States Patent [19]

Henshaw

[11] Patent Number: 4,998,236
[45] Date of Patent: Mar. 5, 1991

[54] APPARATUS FOR HIGH DENSITY HOLOGRAPHIC OPTICAL DATA STORAGE

[75] Inventor: Philip D. Henshaw, Carlisle, Mass.

[73] Assignee: Sparta, Inc., Lexington, Mass.

[21] Appl. No.: 236,604

[22] Filed: Aug. 25, 1988

[51] Int. Cl.$^5$ .............................................. G11B 7/00
[52] U.S. Cl. ................................................... 369/103
[58] Field of Search ............... 365/216, 107, 125, 126, 365/127, 119, 118; 369/112, 103

[56] References Cited

U.S. PATENT DOCUMENTS

| | | | |
|---|---|---|---|
| 3,771,150 | 11/1973 | Schneider | 365/119 |
| 3,829,838 | 8/1974 | Lewis et al. | 364/200 |
| 4,038,647 | 7/1977 | Schneider | 365/119 |
| 4,041,476 | 8/1977 | Swainson | 365/119 |
| 4,101,976 | 7/1978 | Castro et al. | 365/119 |
| 4,103,346 | 7/1978 | Haarer et al. | 365/216 |
| 4,288,861 | 9/1981 | Swainson et al. | 365/127 |
| 4,860,253 | 8/1989 | Owechko et al. | 365/216 |

OTHER PUBLICATIONS

Psaltis, Demetri, DARPA, Conference, Feb. 1988.
Leith et al., "Holographic Data Storage in Three-Dimensional Media", *Applied Optics*, vol. 5, No. 5, Aug. 1966, pp. 1303-1311.
Gutierrez et al., "Multiple Photochemical Hole Burning in Organic Glasses and Polymers: Spectroscopy and Storage Aspects", IBM J. Res. Develop., vol. 26, No. 2, Mar. 1982, pp. 198-208.
Renn et al., "Holographic Detection of Photochemical Holes", *Chemical Physics* 93 (1985), pp. 157-162, North-Holland, Amsterdam.
Moerner et al., "Can Single-Photon Processes Provide Useful Materials for Frequency-Domain Optical Storage?", J. Opt. Soc. Am. B, vol. 2, No. 6, Jun. 1985, pp. 915-1045.
Cibert et al., "Optically Detected Carrier Confinement to One and Zero Dimension in GaAs Quantum Well Wires and Boxes", *Appl. Phys. Lett.*, 49(19), Nov. 10, 1986, pp. 1275-1277.
Temkin et al., "Low-Temperature Photoluminescence from InGaAs/InP Quantum Wires and Boxes", *Appl. Phys. Lett.*, 50(7) Feb. 16, 1987, pp. 413-415.
Kubena et al., "Dot Lithography for Zero-Dimensional Quantum Wells Using Focused Ion Beams", *Appl. Phys. Lett.*, 50(22), Jun. 1, 1987, pp. 1589-1591.
Wu et al., "Effect of Size Nonuniformity on the Absorption Spectrum of a Semiconductor Quantum Dot System", *Appl. Phys. Lett.*, 51(10), Sep. 7, 1987, pp. 710-712.
Renn et al., "Spectral Hole Burning and Hologram Storage", Applied Optics, vol. 26, No. 19, Oct. 1, 1987, pp. 4040-4042.
Kash et al., "Optical Spectroscopy of Ultrasmall Structures Etched from Quantum Wells", *Appl. Phys. Lett.*, 49(16), Oct. 20, 1986, pp. 1043-1045.
Collier et al., "*Optical Holography*", pp. 454-493.
Moerner, *Persistent Spectral Hole Burning: Science and Applications*, pp. 1-15.

Primary Examiner—Donald McElheny, Jr.
Attorney, Agent, or Firm—Thomas J. Engellenner; David A. Jacobs

[57] ABSTRACT

Methods and apparatus for writing and reading data provide storage in a volume of memory material consisting of inhomogenously broadened absorption centers such that a beam of electromagnetic radiation controlled to be independently steered and simultaneously shifted in wavelength can access information stored in four independent dimensions, three spatial and one spectral. The memory medium can be utilized to write and read a selectable connection matrix between two completely populated two-dimensional memory planes.

7 Claims, 2 Drawing Sheets

APPARATUS FOR HIGH DENSITY HOLOGRAPHIC OPTICAL DATA STORAGE

The U.S. Government has rights in this invention pursuant to Defense Department Contract No. N6600-86-C-0095.

BACKGROUND OF THE INVENTION

This invention relates generally to optical memory techniques and devices, and, more particularly, relates to optical data storage techniques and devices utilizing holographic storage in volume media, in conjunction with coherent writing and reading beams.

In recent years, a wide range of different optical media have been considered or proposed for providing high capacity data storage and retrieval. The dimensionality of various media is one identifying characteristic of optical storage systems. Two-dimensional media, such as optical disk and microfiche storage devices, are common. Three-dimensional memory media are also possible. Three-dimensional media include, for example, volume holographic memories. Such media are discussed in R. J. Collier, C. B. Burckhardt, L. H. Lin, "Optical Holography" Academic Press, New York (1971) pp. 454–493, incorporated herein by reference.

A second identifiable characteristic is the use of either holographic or bit-oriented storage. Although schemes have been proposed for selective erasure of data in holographic memories, selective erasure using bit-oriented storage is conceptually simpler. Holographic storage methods in which the reading or writing radiation is incident on the entire memory medium are limited in information capacity by the erasure of old data during reading operations or the storage of new data. However, photon gating or electronic gating of memory planes can solve these problems for both holographic and bit-oriented storage. Holographic storage is less susceptible to dust and media imperfections, but the same effect may be achieved using bit-oriented storage through the use of coding schemes. Holography provides a method of storing and accessing information stored throughout the volume of a medium without the requirement for a complex optical system to access individual planes in the medium.

It is known that multiple two-dimensional planes of data can be stored in a volume holographic medium, and that these planes may be accessed individually by introducing the reference beam into the medium at a different angle for each individual plane of data. A volume medium therefore has three spatial dimensions, corresponding to the dimensionality of the information stored in a two-dimensional output array multiplied by the number of independent reference beam directions in a linear array of reference beams.

Certain conventional optical data storage systems, such as optical disk memory, can provide large storage capacity. In particular, 30,000 tracks multiplied by 150,000 bits per track results in a capacity of approximately 560 Mbytes on a 12 cm optical disk. However, the use of a single detector for readout provides only a serial data stream, which limits the data transfer rate. The disadvantages of this memory device also include difficulties caused by the dynamic focusing and tracking problems associated with a moving disk, the latency or time required to wait for the desired bits to rotate to the reading location, and the wide field of view lens required for bit-oriented access.

In other optical data storage systems, cascaded orthogonal beamsteering stages are used to access data pages stored in a two-dimensional holographic format. In this system, the memory medium is stationary, eliminating the need for active tracking in the beamsteering system. Because the data are stored holographically, no readout optics are required, eliminating the need for a wide-field-of-view high-resolution lens. Parallel readout can be used to obtain an entire two-dimensional array of bits from one beam position, allowing the use of a somewhat slower beamsteering mechanism to be used than for an optical disk, while still maintaining the same data transfer rate. A millisecond deflection time provides a possible data rate of $10^9$ bits per second, which exceeds the data transfer rates of current detector arrays.

However, two-dimensional holographic memory requires high spatial frequency response, and is characterized by limited storage capacity and excessive size, because the information is spread out over a two-dimensional area. The storage capacity of two-dimensional holographic memory is limited by the resolution of the medium. Assuming an array of 1000 by 1000 bits is stored in a 1 cm by 1 cm hologram, a 10 cm by 10 cm memory plane can contain 100 holograms with $10^6$ bits per hologram or $10^8$ bits in total. Since each bit is about 10 $\mu$m in size at the detector array, the optical system must have an optical configuration of approximately f/20 for a 0.5 $\mu$m reading wavelength. Thus, the detector must be approximately 20 cm from the memory plane. Since none of the pages can be directly on-axis, the pages at the far side of the 10 cm by 10 cm array must have an angle of approximately 60° between the illumination and the signal beam, corresponding to a hologram fringe spacing of one wavelength, or 0.5 $\mu$m. Storage of more holograms in a single memory plane would require even greater spatial resolution.

There has long been a need for a high capacity optical data storage technique which eliminates the requirements for mechanical translation or rotation of a storage medium and read/write element—with its associated latency and tracking problems—while providing compact, high density data storage.

It is accordingly an object of the invention to provide a high capacity optical data storage technique in which both the storage medium and the read/write element are substantially stationary, and which provides high access speeds.

It is another object of the invention to provide methods and apparatus adapted for interconnection computing systems.

SUMMARY OF THE INVENTION

This invention provides methods and apparatus for optical data storage and computer interconnection applications. In one aspect of the invention, the apparatus includes a volume of inhomogenously broadened spectral absorption media to store data in four independent dimensions—three spatial and one wavelength dependent. The apparatus also includes elements for providing angular beamsteering and wavelength agility, to access multiple holograms stored in a volume of inhomogenously broadened material.

Utilizing memory media with inhomogenously broadened spectral absorption provides the ability to store multiple data bits at one spatial location. The data are read by probing the area with multiple laser wavelengths. Moreover, multiple holograms can also be stored in the same physical area and read using different laser wavelengths. Thus a tunable, narrow band writing and reading laser provides an important optical memory access component.

Another aspect of the invention includes an inhomogenously broadened four-dimensional memory medium and elements for providing wavelength agility to achieve a general two-dimensional plane to two-dimensional plane connection apparatus.

The invention will next be described in connection with certain preferred embodiments. However, it should be obvious to those skilled in the art that various changes and modifications can be made without departing from the spirit and scope of the invention. For example, various methods can be used for wavelength selection of the reading and writing laser(s). Several methods for steering the reading and writing lasers in two orthogonal angular directions can be employed. Holographic or reflective optics can be used in place of the refractive optical elements.

The invention accordingly comprises the steps and apparatus embodying features of construction, combinations of elements and arrangements of parts adapted to effect such steps, as exemplified in the following detailed description, and the scope of the invention is indicated in the claims.

BRIEF DESCRIPTION OF THE DRAWINGS

For a fuller understanding of the nature and objects of the invention, reference should be made to the following detailed description and the accompanying drawings, in which.

DETAILED DESCRIPTION

Figure 1:
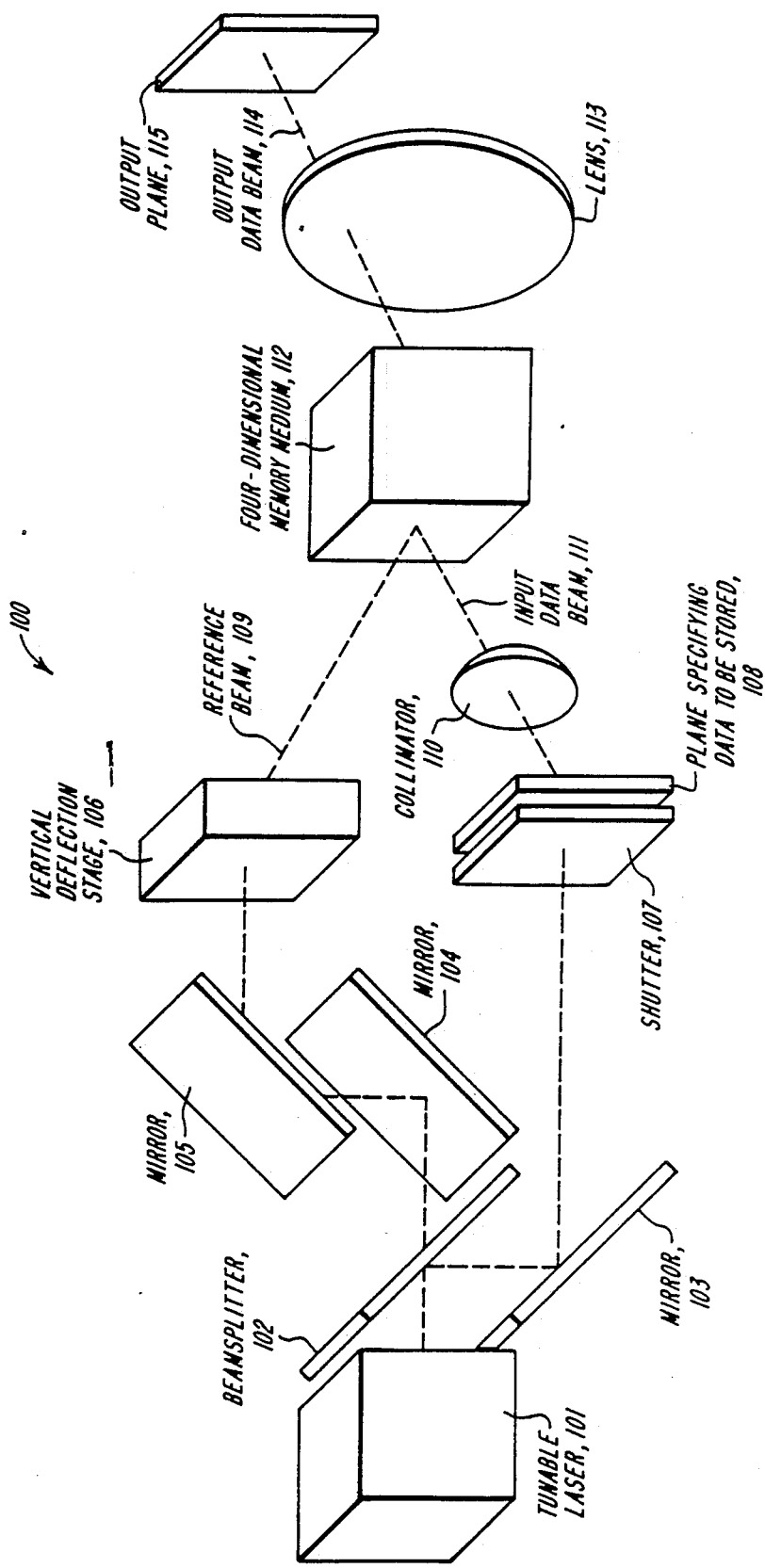
FIG. 1 is a schematic diagram depicting a four dimensional memory device in accordance with the invention.

The optical data storage apparatus 100 shown in FIG. 1 uses a conventional tunable laser source 101 of coherent radiation for optically writing holographic data representations in an optical storage or memory medium 112 and optically reading holographic data representations from the memory medium 112. The reading and writing of holographic data is well known in the art, and is discussed in R. J. Collier, C. B. Burckhardt, L. H. Lin, "Optical Holography" Academic Press, New York (1971) pp. 454–493, incorporated herein by reference.

Unlike conventional holographic storage media, however, the memory medium 112 is preferably a four-dimensional optical storage medium, having three spatial dimensions and one wavelength-dependent dimension. Photochemical spectral hole burning materials (SHBs), for example, can be used in accordance with the invention to store holograms at multiple wavelengths. It is known in the art that absorption sites in the volume of an SHB material are affected by the local polymer environment to absorb photons at slightly different wavelengths. At very low temperatures, each absorption site is unaffected by thermal phonons, so the spectral width of the absorption is very narrow. Since the volume of an absorption site is very small, much less than a cubic wavelength, many absorption sites are available in each region which would normally store one sample of the hologram fringe pattern, and multiple fringe patterns can be stored using different optical wavelengths.

Optical memory media with inhomogenously broadened spectral absorption permit multiple bits to be stored in any physical location. The number of bits is proportional to the ratio of the inhomogenous linewidth of the absorption spectrum to the homogeneous linewidth. For example, in SHB materials this ratio can be as high as $10^3$–$10^4$. SHB materials are discussed in greater detail in W. E. Moerner, ed. "Persistent Spectral Hole-Burning: Science and Applications", Springer-Verlag, New York (1988), incorporated herein by reference; and A. R. Gutierrez, J. Freidrich, D. Haarer, and H. Wolfram, "Multiple Photochemical Hole Burning in Organic Glasses and Polymers: Spectroscopy and Storage Aspects," IBM Vol. 26 *J. Res. Develop.* p. 198 (1982), incorporated herein by reference.

The invention can also be practiced in connection with multiple quantum well dot structures to achieve a four-dimensional memory medium. It is known in the art that the wave function of a conduction electron trapped in a cubic well or dot structure defines a series of sharp resonances. These resonances correspond to preferred photon energies for absorbed photons to "bump" an electron into the conduction band. By changing the well dimensions, the wavelength of absorption can be changed. The dimensions of a quantum dot can be made smaller than a wavelength, so that in each region that would normally store one hologram fringe sample, multiple fringe pattern samples can be stored, corresponding to the number of quantum dots of different dimensions within that region. Quantum dot materials are discussed in greater detail in H. Temkin, G. J. Dolan, M. B. Panish, and S. N. G. Chu, Low-Temperature Photoluminescence from InGaAs/InP Quantum Wires and Boxes, 50 *App. Phys. Lett.* pp. 413–415, incorporated herein by reference; and Wei-Yu Wu et al., "Effect of Size Non-Uniformity on the Absorption Spectrum of a Semiconductor Quantum Dot System", Vol. 51 *Applied Physics Letters*, p. 710 (1987), incorporated herein by reference.

Referring again to FIG. 1, the laser beam generated by the tunable laser source 101 is divided into two mutually coherent beams of radiation by the beamsplitter 102. The first of these two beams is directed by mirrors 104, 105 into a conventional beam deflection stage 106, in which the beam can be, for example, deflected vertically, i.e., in the plane of the drawing, to provide a reference beam 109. The deflection stage 106 preferably provides selected deflection in response to externally applied control signals.

Those skilled in the art will understand that the beam can be controlled in several different ways. For example, utilizing conventional means, the laser wavelength spectrum can be tuned, the laser beam direction can be varied, or the laser wavefront curvature can be changed. Each of these laser beam control methods provides a means to access information stored in the optical medium. Techniques for producing tunable lasers are well known, as are means for producing lasers with a "comb" spectrum. A large number of means for steering a beam of laser radiation exist, including moving mirrors, acousto-optic deflectors, electro-optic deflectors, and photorefractive deflectors.

The reference beam 109 is directed into the four-dimensional memory medium 112, where the beam is used as the reference beam during the writing of information in a holographic format, and as the reconstruction beam during the reading of data stored in a holographic format.

The second beam derived from the tunable laser 101 by means of the beamsplitter 102 is directed by mirror 103 through an external shutter 107 to a data-specifying plane 108. The data-specifying plane 108 includes a conventional spatially-variable transparency which carries a pattern of data in the form of a two-dimensional array of bright or dark spots. This pattern is impressed upon, and carried by, the beam passing through the data-specifying plane 108. The open or closed state of shutter 107 controls execution of the alternate writing and reading functions of the memory apparatus 100.

During writing, the shutter 107 is open, permitting the beam from mirror 103 to reach the data-specifying plane 108. The input data beam 111, which carries the input data specified by data-specifying plane 108, passes through collimator 110 to the memory medium 112 where the input data beam 111 is combined with the reference beam 109. The reference beam 109 and the input data beam 111 are coherent, and form an interference pattern throughout the volume of the memory medium 112. This interference pattern, when recorded in the memory medium at a specific wavelength, can be used to reconstruct the data pattern impressed on the data beam 111.

During the reading process, the shutter 107 is closed, and only the radiation in the reference beam 109 reaches the memory medium 112. The memory medium 112 transmits diffracted output radiation which is collimated by lens 113 to produce an output data beam 114. In accordance with the invention, when a large number of different patterns are stored in the memory medium 112, the pattern of interest can be selected by controlling the direction and wavelength of the reference beam 109 to be exactly equal to the direction and wavelength used to record the desired data. When this equality is satisfied, the beam 114 carrying the output data diffracted from the memory medium 112 will project the desired array of output data onto the output plane 115. The output plane 115 may be, for example, a two-dimensional CCD array which produces electrical signals responsive to the light incident upon its surface. Alternatively, the output plane 115 may be a spatial light modulating optical computing element.

An important feature of the invention is the large data capacity which is achieved due to the large number of independent reference beams which can be generated by varying the angle and wavelength of the reference beam. Extremely large storage capacity can be achieved through the use of angular and spectral multiplexing of data in a thick volume medium. For example, the memory medium can contain multiple holograms, each representing an array of $1000 \times 1000$ bits. By varying the reference beam angle, as many as 500 holograms can be stored at each wavelength. Using 1000 different wavelengths to store data in the medium, a total of $5 \times 10^{11}$ bits can be stored in a 1 cm cube.

In addition to the extremely large capacity provided by the four-dimensional memory apparatus, four-dimensional memory is fundamentally necessary for certain important applications. Neural network research, for example, has investigated the means for connecting two fully populated data planes in a selectable fashion. The selectable connection of two fully-populated two-dimensional planes has been an important goal of recent optical computing research. The ability to realize a completely selectable interconnection device has important implications for neural network application to such important problems as vision preprocessing, pattern and speech recognition, and the solution of difficult mathematical problems which can be expressed in matrix form.

It has been shown that due to duplication of volume gratings stored in the memory medium, selectable connections cannot be achieved between two fully-populated two dimensional planes. Instead a solution has been proposed which limits the number of populated elements in the input and output planes to $K^{3/2}$ where K is proportional to $S/\lambda$, with S being the dimension of one side of the input plane or interconnection medium, and $\lambda$ being the wavelength used to illuminate the input plane. The required $K^3$ interconnections can be stored in a volume of size proportional to K wavelengths on a side.

By utilizing an optical memory medium with four independent dimensions available for storage of interconnections, $K^4$ connections can be stored, sufficient to interconnect two planes each containing $K^2$ elements. These $K^2$ elements can be placed so as to completely fill the input and output planes.

The four dimensional optical memory apparatus to be disclosed here can be used to implement one stage of a neural network which connects two 2-dimensional planes; such a network can be used, for example, in speech or vision preprocessing, or in the solution of complicated optimization problems which are difficult to perform on current digital computers.

Figure 2:
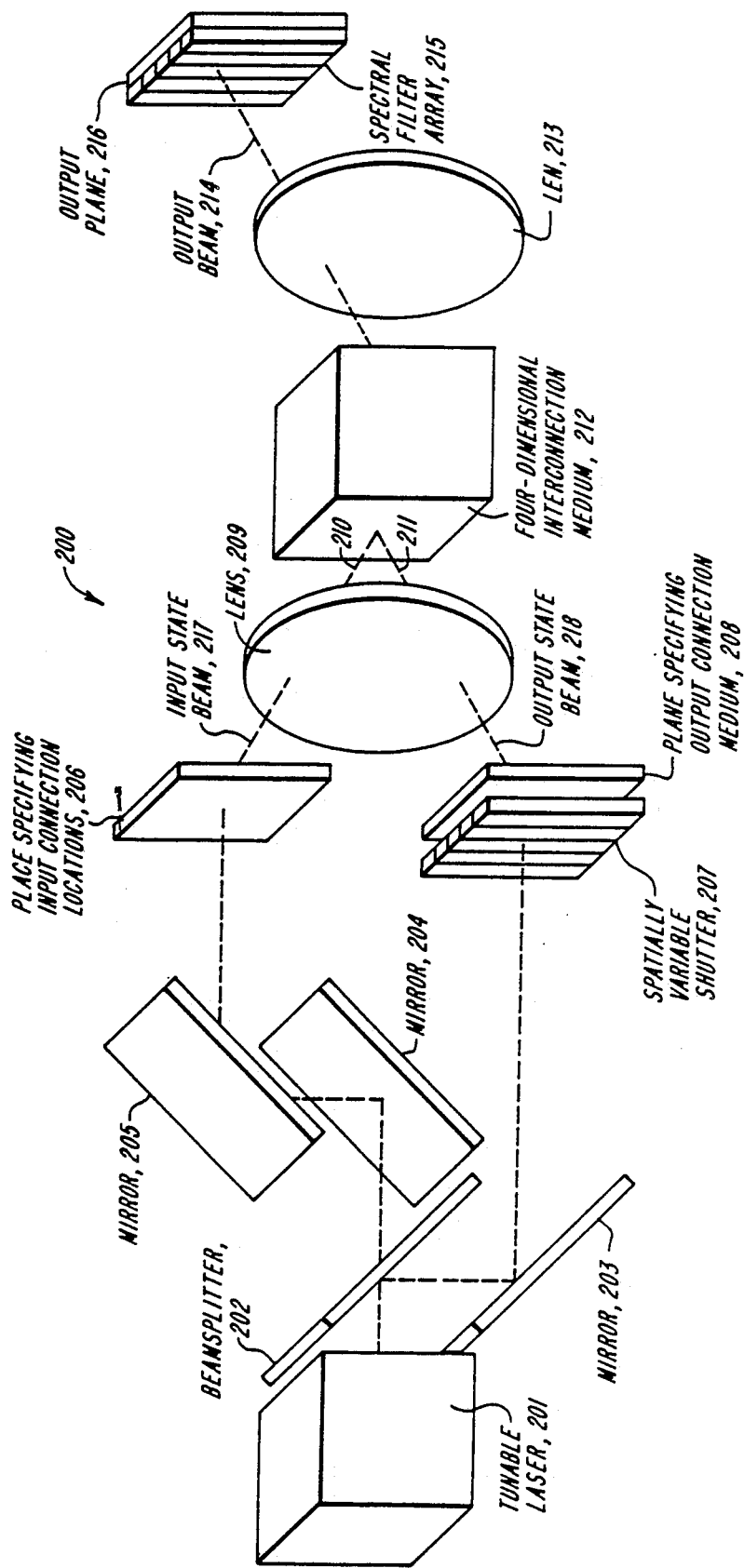
FIG. 2 is a schematic diagram depicting a connection apparatus in accordance with the invention, utilizing a four dimensional memory for selectable connection between two 2-dimensional planes.

FIG. 2 depicts a four-dimensional interconnection apparatus 200 in accordance with the invention. The interconnection apparatus 200 operates in a manner similar to that of the embodiment illustrated in FIG. 1, utilizing a tunable laser source 201 of coherent radiation for executing optical interconnection operations for the interconnection of designated active sites of one memory element (referred to as the input) with the designated active sites of another memory element (referred to as the output). These operations include optically writing data in the four-dimensional interconnection medium 212 and optically reading data from the medium.

The beam generated by the tunable laser source 201 is divided into two mutually coherent beams of radiation by the beamsplitter 202. The first of these two beams is directed by mirrors 204, 205 through an input connection-specifying plane 206. The input connection-specifying plane 206 includes a conventional spatially-variable transparency which carries a pattern of data in the form of a two-dimensional array of bright or dark spots. The pattern carried on the input connection-specifying plane specifies designated active input locations which are to be connected to designated active output locations. This pattern is impressed upon the beam from mirror 205 to generate an input state beam 217.

The second beam derived from the tunable laser by means of the beamsplitter is directed using mirror 203 to an output connection-specifying plane 208 controlled by spatially variable shutter 207. Output connection-specifying plane 208 includes a spatially-variable transparency carrying a pattern of data in the form of a two-dimensional array of bright or dark spots. This pattern is impressed on the beam from mirror 203 to transmit an output state beam 218 specifying the designated active output locations. The spatially-variable shutter 207 controls whether the "interconnection"

(reading) or "learning" (writing) function of the network apparatus 200 will be executed.

During the learning operation, the shutter 207 is opened at a sequence of locations forming a set of vertical stripes, permitting the output state beam 218 to reach the interconnection medium 212 through lens 209, where it is combined with the input state beam 217. The two beams are coherent, and form an interference pattern throughout the volume of the four-dimensional interconnection medium 212. In accordance with the invention, a different wavelength is used for each vertical stripe to prevent crosstalk between the patterns stored in association with different vertical columns.

Those skilled in the art will understand that this interference pattern, when recorded in the interconnection medium 212 at a specific wavelength, can be used to connect the data activity at a series of input locations to an selectable set of output locations or states arranged in communication with the two-dimensional output plane 216. In particular, the selected interference pattern stored in interconnection medium 212 is transmitted through collimator 213, and the resulting output beam 214 is projected onto output plane 216, which may be, for example, a two-dimensional CCD array.

During the interconnection operation, the shutter 207 is closed, and only the radiation in the input state beam 217 reaches the interconnection medium 212. Those skilled in the art will appreciate that when many different patterns have been stored in the interconnection medium 212, the medium of interest can be used to perform selectable connections between input states and output states by simultaneously illuminating all input states with all the wavelengths used during the learning process. Each input state can be connected to any output state, but only the contributions at the output at the wavelength used to record connections to that state are of interest. A spectral filter array 215, positioned in the path of output beam 214 is utilized for filtering the beam directed at output plane 216, to select the proper contributions for each state.

It will thus be seen that the invention efficiently attains the objects set forth above, among those made apparent from the preceding description. In particular, the invention provides a high-capacity, high access speed memory system.

It will be understood that changes may be made in the above construction and in the foregoing sequences of operation without departing from the scope of the invention. For example, various methods can be used for wavelength selection of the reading and writing lasers. Several methods for steering the reading and writing lasers in two orthogonal angular direction can be employed, and holographic or reflective optics can be used in place of the refractive optical elements illustrated in the Figures.

It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. An optical data storage system for writing and reading data into and out of a storage medium, the system comprising
   storage means for storing holographic representations of data in $(N+1)$ independent dimensions where N is an integer equal to or greater than three, and
   read/write means for reading and writing data into and out of said storage means in $(N+1)$ independent dimensions, where N is an integer equal to or greater than three, said read/write means including
      light beam means for generating a light beam having a controllable wavelength,
      beamsteering means for steering said light beam in at least $(n-2)$ dimensions, said beamsteering means including
         first spatial light modulator means for spatially modulating said light beam, responsive to applied electrical control signals, for writing said data, and
         second spatial light modulator means for spatially modulating said light beam, in response to applied optical control signals, for writing said data, and
      wavelength control means for controlling the wavelength of said light beam, wherein said wavelength corresponds to an $(N+1)$th dimension of said holographic representations of data.

2. A system according to claim 1, wherein said storage means includes a polymer exhibiting inhomogenous spectral broadening of optical absorption.

3. A system according to claim 1, wherein said storage means includes a multiple quantum well semiconductor material.

4. An optical interconnection system for storing an interconnection matrix for selectably interconnecting an input memory plane and an output memory plane, each plane having a set of memory cells arranged in two dimensions, the system comprising
   storage means for storing holographic representations of interconnection-specifying data patterns in at least four independent dimensions,
   single wavelength writing laser means, tunable to plural, discrete wavelengths, each wavelength corresponding to a respective discrete sector of the output plane, for writing said data patterns into said storage means, and
   multiple wavelength reading laser means, capable of generating a light beam of multiple wavelengths, for reading said data patterns.

5. A system according to claim 4, wherein said storage means includes a polymer exhibiting inhomogenous spectral broadening of optical absorption.

6. A system according to claim 4, wherein said storage means includes a multiple quantum well semiconductor material which exhibits quantum conduction electron confinement, for creating narrow spectral absorption.

7. A system according to claim 4, further including
   first input spatial light modulator means for spatially modulating said light beam for reading and writing data patterns to and form said input memory plane in response to applied electrical control signals,
   second input spatial light modulator means for spatially modulating said light beam for reading and writing data patterns to and from said input memory plane in response to applied optical control signals, first output spatial light modulator means for spatially modulating said light beam for reading and writing data patterns to and from said output memory plane in response to applied electrical control signals, second output spatial light modulator means, including plural spectral filters, for spatially modulating said light beam, for reading and writing data patterns to and from said output memory plane in response to applied optical control signals.

* * * * *